Feb. 14, 1967  S. D. WILTSE  3,304,104
TUBE COUPLING

Filed May 4, 1964  2 Sheets-Sheet 1

INVENTOR.
SUMNER D. WILTSE
BY
*Whittemore, Hulbert & Belknap*
ATTORNEYS

Feb. 14, 1967  S. D. WILTSE  3,304,104
TUBE COUPLING

Filed May 4, 1964  2 Sheets-Sheet 2

INVENTOR.
SUMNER D. WILTSE
BY
*Whittemore, Hulbert & Belknap*
ATTORNEYS

United States Patent Office 3,304,104
Patented Feb. 14, 1967

3,304,104
TUBE COUPLING
Sumner D. Wiltse, Detroit, Mich., assignor to Vibraseal Corporation, Detroit, Mich., a corporation of Michigan
Filed May 4, 1964, Ser. No. 364,403
6 Claims. (Cl. 285—5)

This invention relates generally to tube couplings, and refers more particularly to an efficient means for coupling together in end-to-end relation two tubes adapted to be employed in pneumatic systems, irrigation projects, or conduits for electrical wiring.

One of the essential objects is to provide a tube coupling wherein two tubes are provided at their adjacent ends with sleeves which have at their adjacent ends shaped portions that are adapted to be received one within the other.

Another object is to provide a tube coupling wherein one of said shaped portions is an enlarged annular formation and has a three sided inwardly opening annular groove therein for engagement with three sides of said polygonal ring, and the other of said shaped portions is of segmental formation and comprises a circumferentially extending outwardly inclined flange that is engageable with an additional side of said polygonal ring in diametrically opposed relation to an inclined side of said three-sided annular groove.

Another object is to provide a tube coupling wherein the enlarged shaped portion of annular formation has two longitudinally spaced outwardly flaring portions, one at the outer side of the annular groove to facilitate insertion of the shaped portion of segmental formation into the enlarged shaped portion of annular formation, and the other at the inner side of said annular groove to limit insertion of the shaped portion of segmental formation relative to the polygonal ring within the three-sided inwardly opening groove in the enlarged shaped portion of annular formation.

Another object is to provide a tube coupling wherein the end of the tube having thereon the shaped portion of segmental formation may be inserted at an angle into the enlarged shaped portion of annular formation on the other tube when the latter is in horizontal position, and after such shaped portion of segmental formation engages the inner side of the polygonal ring within the three-sided annular groove in the enlarged shaped portion of annular formation, such inclined tube may be lowered into alignment with the other tube, at which time the two tubes are effectively locked in assembled end-to-end relation with each other.

Another object is to provide a tube coupling wherein the polygonal ring serves as a fulcrum for the shaped portion of segmental formation during the insertion of the end of the tube within the enlarged shaped portion of annular formation on the other tube.

Another object is to provide a tube coupling wherein the polygonal ring engages the three sides of the annular groove in the enlarged shaped portion of annular formation of the sleeve on one tube and engages the other of said sleeves and the flange thereof, whereby such ring serves as a combined sealing and retaining ring when the tubes are in end-to-end relation with each other.

Another object is to provide a tube coupling wherein the weight of the tube having thereon the shaped portion of segmental formation is such that said tube will be retained in end-to-end relation with the other tube after the parts are assembled.

Another object is to provide a tube coupling wherein the tube having thereon the shaped portion of segmental formation may be disassembled from each other tube by being initially raised at an angle to the other tube to disengage the shaped portion of segmental formation from the polygonal ring, and then may be withdrawn from said other tube.

Another object is to provide a tube coupling wherein the shaped portion of segmental formation enables the two tubes to be easily and quickly assembled and disassembled.

Another object is to provide a tube coupling that is simple in construction, economical to manufacture and efficient in use.

Other objects, advantages and novel details of construction of this invention will be made more apparent as this description proceeds, especially when considered in connection with the accompanying drawings, wherein.

Figure 1:
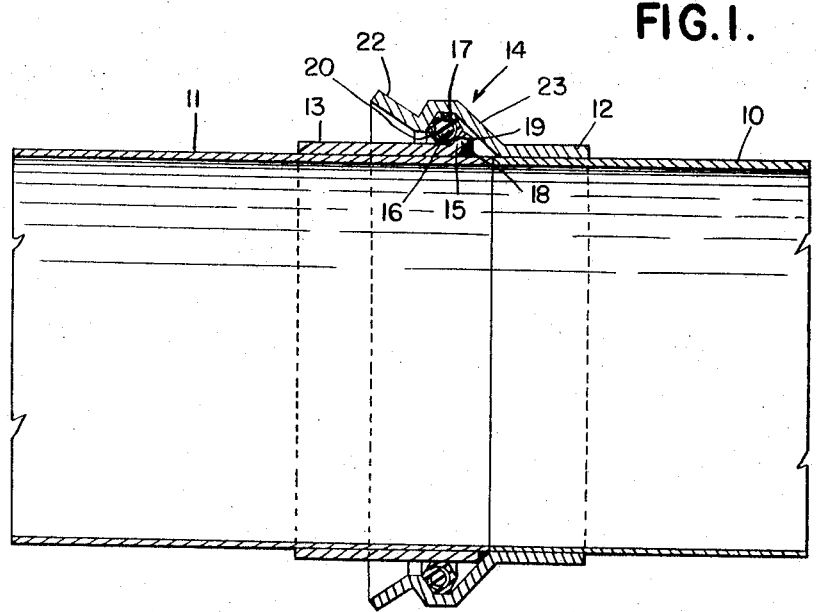
FIGURE 1 is a fragmentary longitudinal vertical sectional view through a tube coupling embodying my invention.
Figure 2:
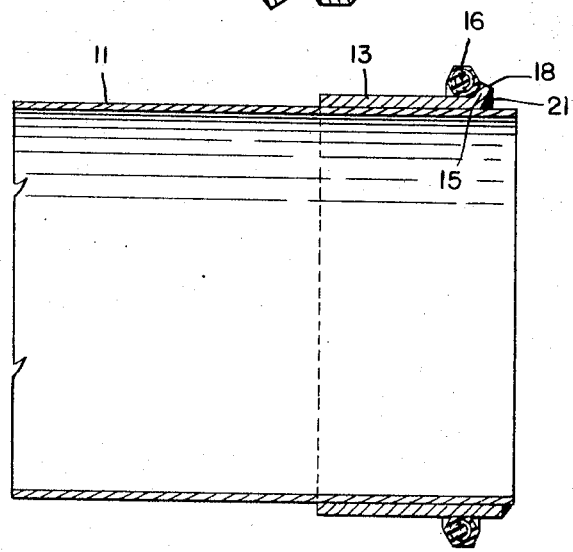
FIGURE 2 is a fragmentary longitudinal vertical sectional view through one of the tubes shown in FIGURE 1, through a sleeve on said tube, and through a polygonal ring in engagement with the outwardly inclined flange of said sleeve.
Figure 4:
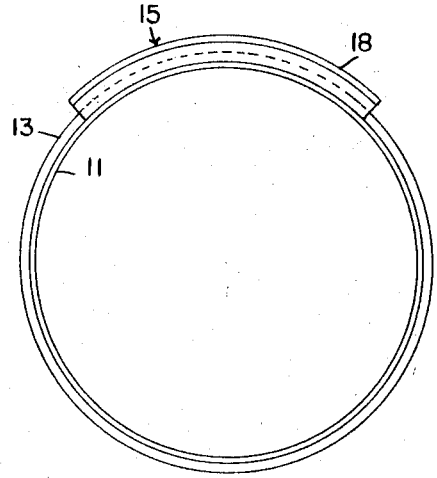
FIGURE 4 is an end view of the construction shown in FIGURE 3, without the polygonal ring.
Figure 3:
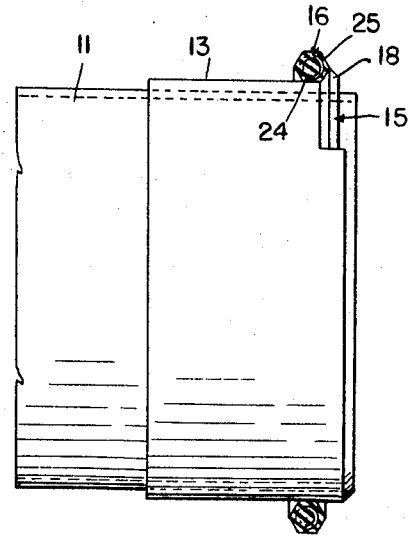
FIGURE 3 is a fragmentary elevational view of one of the tubes shown in FIGURE 1, and of the sleeve on said tube, and showing in section the polygonal ring in engagement with the outwardly inclined flange of said sleeve.
Figure 5:
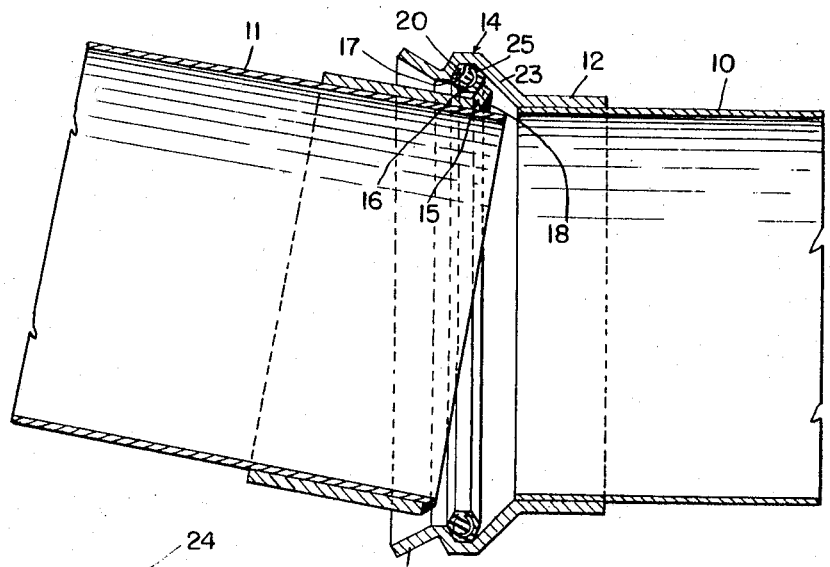

FIGURE 5 is a fragmentary longitudinal vertical sectional view through the two tubes during the assembly thereof with one tube inclined relative to the other tube, and showing the outwardly inclined flange of the sleeve on said one tube in engagement with the polygonal ring within the three-sided inwardly opening annular groove in the enlarged shaped portion of annular formation of the sleeve on the other tube.

Figure 6:
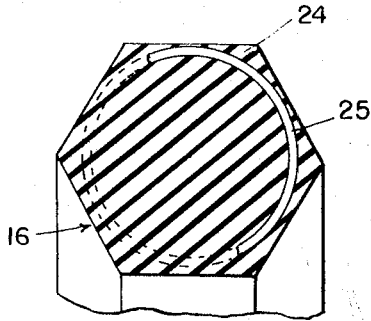

FIGURE 6 is an enlarged fragmentary vertical sectional view through the sealing ring.

Referring now to the drawings, 10 and 11 respectively are two tubes provided at their adjacent ends with sleeves 12 and 13 respectively which have at their adjacent ends shaped portions 14 and 15 respectively that are adapted to be received one within the other. As shown, the sleeves 12 and 13 respectively fit tightly upon the tubes 10 and 11, and may be secured thereto in any suitable manner.

The shaped portion 14 of the sleeve 12 is an enlarged annular formation and is provided substantially midway its ends with a three-sided inwardly opening annular groove 17 for engagement with three sides of the polygonal ring 16. The shaped portion 15 of the sleeve 13 is of segmental formation and comprises a circumferentially extending outwardly inclined flange 18 that is engageable with an additional side 19 of said polygonal ring in diametrically opposed relation to an inclined side 20 of said three-sided annular groove 17. As shown, such shaped portion 15 of segmental formation extends approximately 60° to 90° of the circumference of the sleeve 13 and is welded at 21 to the tube 11.

Preferably, the enlarged shaped portion 14 of annular formation has two longitudinally spaced outwardly flaring annular portions 22 and 23 respectively located at the outer and inner sides respectively of the annular groove 17. As shown, the outwardly flaring portion 22 at the outer side of the annular groove 17 is adapted to facilitate insertion of the shaped portion 15 of segmental formation into the enlarged shaped portion 14 of annular formation, and the outwardly flaring portion 23 at the inner side of the annular groove 17 is adapted to limit insertion of the shaped portion 15 of segmental formation relative to the polygonal ring 16 within the three-sided inwardly opening groove 17 in the enlarged shaped portion 14 of annular formation.

The polygonal ring 16 comprises an annular solid body 24 of rubber or rubber-like material or rubber composition and an annular reinforcing metallic helix or spring 25 entirely embedded within and concealed by said annular body 24. As shown, the longitudinal center line of said helix or spring 25 coincides with the center longitudinal line of the annular solid body 24. Preferably, the annular body 24 has a uniform hexagonal radial cross section throughout its circumference, whereby five surfaces respectively of such annular body are adapted to have surface-to-surface sealing engagement with the three sides of said groove 17 in the enlarged shaped portion 14 of the sleeve 12 and with the sleeve 13 and the outwardly inclined flange 18 of the sleeve 13.

To assemble the parts, the polygonal ring 16 is first inserted into the annular groove 17 in the enlarged shaped portion 14 of annular formation of the sleeve 12 on the tube 10. Then the tube 11 is raised at an angle to the tube 10 so that the end of said tube 11 having thereon the shaped portion 15 of segmental formation may be inserted at an angle into the enlarged shaped portion 14 of annular formation on the other tube 10 when the latter is in a horizontal position, and after such shaped portion 15 of segmental formation engages the inner side of the polygonal ring 16 within the three-sided annular groove 17 in the enlarged shaped portion 14 of annular formation, such inclined tube 11 is lowered into alignment with the other tube 10, at which time the two tubes are effectively locked in assembled end-to-end relation with each other.

During assembly of the parts, the polygonal ring 16 serves as a fulcrum for the shaped portion 15 of segmental formation. Moreover, the polygonal ring 16 also serves as a combined sealing and retaining ring after the inclined tube 11 is lowered as aforesaid in end-to-end relation with the other tube 10. Also, the weight of the tube 11 having thereon the shaped portion 15 of segmental formation is such that such tube will be retained in end-to-end relation with the other tube 10 after the parts are assembled.

If desired, the tube 11 having thereon the shaped portion of segmental formation may be disassembled from the other tube 10 by being initially raised at an angle to said other tube 10 to disengage the shaped portion 15 of segmental formation from the polygonal ring 16, and then may be withdrawn from said other tube 10. Thus, the shaped portion 15 of segmental formation enables the two tubes 10 and 11 to be easily and quickly assembled and disassembled.

What I claim as my invention is:

1. A tube coupling comprising two tubes arranged in end-to-end abutting relationship, a sleeve secured to each of said tubes adjacent their ends, one of said sleeves having an enlarged annular portion provided with a three-sided inwardly opening annular groove and having at the outer and inner sides respectively of said annular groove outwardly flaring annular portions, the other of said sleeves having an outer cylindrical surface extending into said enlarged annular portion, said other sleeve having a segmental circumferentially extending inclined flange disposed substantially parallel to one side of said three-sided annular groove, said inclined flange and said one side of said three-sided annular groove having at least portions thereof in spaced opposed relation, and a combined sealing and retaining ring having an elastomeric exterior surface and a reinforcing means imbedded therein, said ring having a hexagonal radial cross section and disposed within and having sealing engagement with the three sides of said three-sided annular groove and having sealing engagement with said outer cylindrical surface and with the outer side of said flange, the outwardly flaring annular portion upon the outer side of said annular groove being operable to facilitate insertion of said ring into engagement with said annular groove and operable to facilitate insertion of said segmental flange into engagement with said ring, the outwardly flaring annular portion upon the inner side of said annular groove being operable to limit insertion of said segmental flange relative to said ring.

2. A tube coupling comprising two tubes arranged in end-to-end abutting relationship, a sleeve secured to each of said tubes adjacent their ends, one of said sleeves having an enlarged annular portion provided with an inwardly opening annular groove, the outer inwardly facing side of said groove being inclined, the other of said sleeves having an outer cylindrical surface extending into said enlarged annular portion, said other sleeve having a segmental circumferentially extending inclined flange disposed opposite and substantially parallel to the outer inclined side of said annular groove said inclined groove side and said inclined flange having at least portions thereof in spaced, opposed relation, and a combined sealing and retaining ring having an elastomeric exterior surface and a reinforcing means imbedded therein, said ring having a hexagonal radial cross section and disposed within and having sealing engagement with the outer inclined side of said annular groove and having sealing engagement with said outer cylindrical surface and with the outer side of said inclined flange.

3. A tube coupling as defined in claim 2, wherein said annular groove is three sided.

4. A tube coupling as defined in claim 2, wherein said one sleeve having at the outer side of said annular groove an outwardly flaring annular portion, said outwardly flaring annular portion being operable to facilitate insertion of said ring into engagement with said annular groove and operable to facilitate insertion of said segmental flange into engagement with said ring.

5. A tube coupling as defined in claim 2, wherein said one sleeve having at the inner side of said annular groove an outwardly flaring annular portion, said outwardly flaring annular portion being in the path of and operable to limit insertion of said segmental flange relative to said ring.

6. A tube coupling as defined in claim 2, wherein said one sleeve having at the outer and inner sides respectively of said annular groove outwardly flaring annular portions, the outwardly flaring annular portion upon the outer side of said annular groove being operable to facilitate insertion of said ring into engagement with said annular groove and operable to facilitate insertion of said segmental flange into engagement with said ring, the outwardly flaring annular portion upon the inner side of said annular groove being in the path of and operable to limit insertion of said segmental flange relative to said ring.

References Cited by the Examiner

UNITED STATES PATENTS

| | | | |
|---|---|---|---|
| 2,354,538 | 7/1944 | Parker | 285—234 |
| 2,449,229 | 10/1948 | Hopwood | 285—192 |
| 2,846,240 | 8/1958 | Beyer | 285—5 |
| 3,027,179 | 3/1962 | Wiltse | 285—321 |
| 3,033,514 | 5/1962 | Grosch | 285—209 X |
| 3,218,095 | 11/1965 | Wiltse | 285—365 X |

CARL W. TOMLIN, *Primary Examiner.*

T. F. CALLAGHAN, *Assistant Examiner.*